United States Patent [19]

Iwashita et al.

[11] Patent Number: 5,467,281

[45] Date of Patent: Nov. 14, 1995

[54] CONTROLLER FOR POWER STEERING APPARATUS

[75] Inventors: Shigeo Iwashita; Akihiro Ohno, both of Okazaki; Takashi Shirai, Toyokawa, all of Japan

[73] Assignee: Toyoda Koki Kabushiki Kaisha, Kariya, Japan

[21] Appl. No.: 208,953

[22] Filed: Mar. 11, 1994

[30] Foreign Application Priority Data

Mar. 13, 1993 [JP] Japan .................................. 5-078991
Mar. 13, 1993 [JP] Japan .................................. 5-078992

[51] Int. Cl.⁶ .............................. B62D 5/04; B62D 5/06
[52] U.S. Cl. .................................. 364/424.05; 180/79.1; 180/142
[58] Field of Search ................... 364/424.05, 424.04, 364/424.03, 161, 162, 165, 176; 180/132, 143, 142, 79.1

[56] References Cited

U.S. PATENT DOCUMENTS

| | | | |
|---|---|---|---|
| 4,714,988 | 12/1987 | Hiroi et al. ........................ | 364/176 |
| 4,842,089 | 6/1989 | Kimbrough et al. ................ | 364/424.01 |
| 4,878,557 | 11/1989 | Shibahata et al. ................. | 180/142 |
| 4,885,676 | 12/1989 | Zweighaft ......................... | 364/176 |
| 4,912,753 | 3/1990 | Evans, Jr. ......................... | 364/165 |
| 4,971,173 | 11/1990 | Takahashi ......................... | 180/142 |
| 5,248,921 | 9/1993 | Kato et al. ........................ | 364/176 |
| 5,251,124 | 10/1993 | Matsunaga ........................ | 364/176 |

Primary Examiner—Kevin J. Teska
Assistant Examiner—Tyrone V. Walker
Attorney, Agent, or Firm—Oblon, Spivak, McClelland, Maier, & Neustadt

[57] ABSTRACT

A controller for a power steering apparatus in which operation fluid for generating assist torque is pumped by a motor-driven pump. The controller controls the flow rate of the operation fluid by changing the voltage supplied to the motor. The controller is provided with a section for generating a target value representing a target voltage to be supplied to the motor, a section for detecting the voltage actuary supplied to the motor, and a section for generating a voltage compensation value based on the detected voltage. The voltage compensation value is obtained by integrating a voltage difference between the target voltage and the detected voltage. The voltage compensation value is added to the target value to obtain a compensated target value. The motor is driven by a voltage corresponding to the compensated target value. In another type of controller, a voltage following rate indicating a target variation in voltage is increased to increase the voltage supplied to the motor only when the voltage difference increases. With this, responsiveness can be increased without causing overshoots.

11 Claims, 8 Drawing Sheets

CONTROLLER FOR POWER STEERING APPARATUS

BACKGROUND OF THE INVENTION

1. Field of the Invention

The present invention relates to a controller for a power steering apparatus which controls assist torque produced by the power steering apparatus.

2. Discussion of Related Art

In conventional power steering apparatus, pressurized fluid is utilized to generate and control assist torque. Further, there has been proposed a power steering apparatus in which pressurized fluid is supplied by a hydraulic pump driven by an electric motor. In such a power steering apparatus, called "motor-driven pump type", has an advantage in that the rotational speed of the pump can freely be controlled. In order to control the power steering apparatus of the motor-driven pump type, there has been proposed a feed back control in which the drive voltage supplied to the electric motor of the pump is continuously detected, and the drive voltage is controlled by PI (proportional plus integral) control based on the detected drive voltage so that the drive voltage follows a target drive voltage.

However, in such a feed back control, extraordinary cases sometimes arise where the difference between a target voltage and the detected drive voltage becomes as large as the target voltage. For example, the difference becomes as large as the target voltage when an abrupt variation occurs in the drive circuit immediately after the power switch is turned on. For quickly reducing the difference, the capacity of compensation, i.e., the gain of a drive circuit for driving the motor, must be set to be very high. However, if the gain of the drive circuit is set to be very high, the stability in an ordinary state is deteriorated. In detail, even when the drive voltage is slightly deviated from a target voltage due to disturbance, a compensation voltage whose magnitude is almost equal to that of the target voltage is produced to compensate the difference. Such excessive compensation is disadvantageous in drive circuits for a motor-driven pump, in which a stability is regarded as an important factor to obtain a proper ability of following (hereinafter referred to as "followability").

Further, in cases where the feed back function of the drive circuit is stopped due to a malfunction of the drive circuit, the difference becomes large due to an abnormal feed back signal, even though the target voltage is properly calculated and output. In such a case, the rotational speed of the motor-driven pump cannot be controlled properly. This brings about a fear that assist torque is not properly generated by the power steering apparatus and also a problem that energy may be wastefully consumed by the motor.

Moreover, when it is tried to increase the following rate of the drive voltage with respect to a target voltage, namely, the responsiveness in the conventional controller utilizing PI control, a control value, according to which the motor is driven, suffers from overshoots, as is well known in the control theory. Due to such overshoots, the control value cannot follow the target voltage in cases where the target voltage frequently changes, resulting in deterioration of the control accuracy. Accordingly, in order to make the operation of the controller stable, the responsiveness must be low. However, the responsiveness cannot be sacrificed in the control for motor-driven pumps, because a high responsiveness is required to quickly change assist torque. Therefore, it has been desired to develop a controller for motor-driven pumps which can increase the control accuracy without sacrificing the responsiveness.

SUMMARY OF THE INVENTION

An object of the present invention is to provide an improved controller for a power steering apparatus in which the control accuracy is improved.

Another object of the present invention is to provide an improved controller for a power steering apparatus in which production of a large error can be prevented even in an abnormal state.

Still another object of the present invention is to provide an improved controller for a power steering apparatus in which overshoots in the control are reduced.

Briefly, the present invention provides an improved controller for a power steering apparatus in which voltage supplied to a motor is controlled for changing assist torque produced by the power steering apparatus.

In accordance with a first aspect of the present invention, the controller includes means for generating a target value representing a target voltage to be supplied to the motor, means for detecting a voltage supplied to the motor, means for generating a voltage compensation value based on the detected voltage, means for adding the voltage compensation value to the target value to obtain a compensated target value, and means for supplying the motor with a voltage corresponding to the compensated target value.

In the controller, a basic target value representing a target voltage to be supplied to the motor is first determined, and the basic target value is compensated based on a difference between the target voltage and the detected voltage. As a result, the amount of compensation can be made small, and the voltage supplied to the motor quickly converges to the target voltage. This improves the control accuracy.

Since a section for outputting the compensation value is required to output only a small compensation value, the power consumption of the controller can be reduced.

Further, even in an abnormal state in which the compensation value abnormally varies, the control of the motor is not affected very much, because the compensation value has a smaller influence than the basic target value.

In a preferred embodiment, there are provided means for calculating a voltage difference between the target voltage and the detected voltage and means for integrating the calculated voltage difference to obtain the voltage compensation value.

Further, in the preferred embodiment, there is provided means for changing the target value depending on a voltage of a power source from which electricity is supplied to the motor.

According to a second aspect of the present invention, the controller includes means for calculating a voltage difference between a detected voltage actually supplied to the motor and the target voltage, means for obtaining a voltage following rate based on the voltage difference, means for detecting variations in the voltage difference, and means for increasing the voltage following rate to obtain a compensated voltage following rate when a detected variation in the voltage difference increases. In one preferred embodiment, the compensated voltage following rate is used to compensate a target voltage, and the motor is driven in accordance with the compensated target voltage. In another embodiment, the motor is driven by a voltage corresponding to the compensated voltage following rate.

It is known that the voltage difference periodically increases in cases of overshoots in which the voltage actually supplied to the motor considerably deviates from the target value. In such a case, the controller of the present invention compensates the following rate so that the deviation is quickly reduced. Accordingly, overshoots are effectively reduced and the voltage supplied to the motor is quickly converged to the target value without causing vibrations. Consequently, the followability and the control accuracy are increased.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 1 is an overall view showing the structure of a power steering apparatus according to a first embodiment of the present invention;

FIGS. 2(a) and 2(b) are characteristic curves for explaining a method of determining a target voltage;

DETAILED DESCRIPTION OF PREFERRED EMBODIMENTS

The present invention will now be described with reference to the attached drawings.

Figure 1:
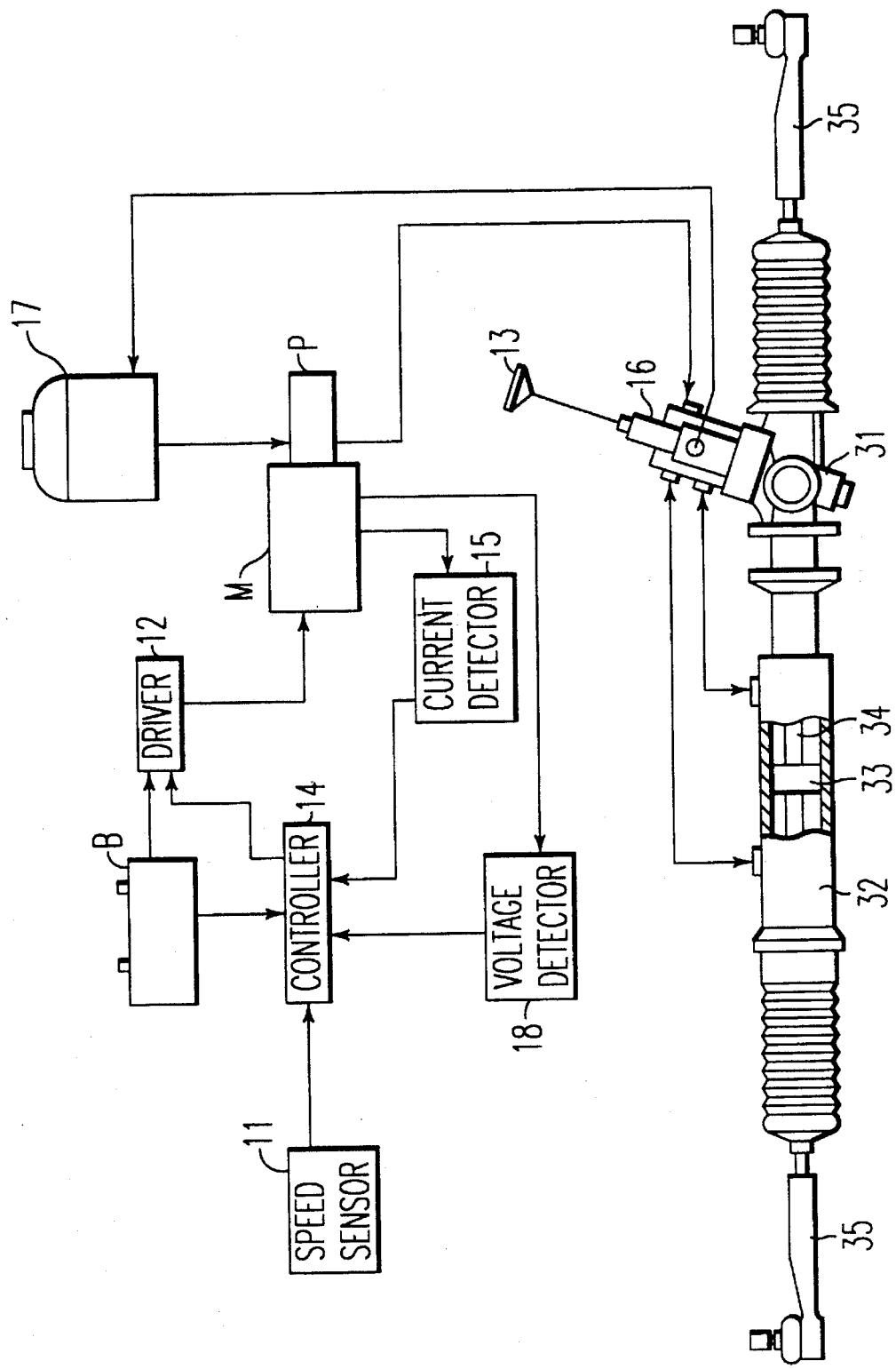

First Embodiment:

FIG. 1 shows the overall structure of a power steering apparatus according to a first embodiment of the present invention. In the drawing, numeral 11 denotes a speed sensor for detecting vehicle speed, and numeral 14 denotes a controller. Output signals from the speed sensor 11 is input to the controller 14. The controller 14 is connected to a driver 12, which controls the supply of electricity from a battery B to a motor M in accordance with control signals from the controller 14. The controller 14 is mainly composed of a CPU and a memory. The memory stores therein a first characteristic curve shown in FIG. 2(a) which defines the relationship between vehicle speed detected by the speed sensor 11 and a first target value Va of voltage supplied to the motor M (hereinafter referred to as "motor voltage value $V_M$"), and a second characteristic curve shown in FIG. 2(b) which defines the relationship between load current detected by a current detector 15 which will be described later and the target value Vb of the motor voltage $V_M$.

P denotes a pump which is driven by the motor M and is integrally assembled with the motor to form a motor-driven pump. Pressurized fluid output from the pump P is fed to a servo valve 16. Further, load current flowing through the motor M is detected by the current detector 15 while the motor voltage is detected by a voltage detector 18. Output signals from these detectors are input to the controller 14.

Numeral 31 denotes a gear housing of the power steering apparatus, in which a rack and pinion gear mechanism is assembled. Numeral 32 denotes a power cylinder for producing assist torque. The supply of operational fluid to the power cylinder 32 and drain of the operational fluid from the power cylinder 32 are controlled by the servo valve 16, so that a piston 33 received in the power cylinder 32 is axially moved. The movement of the piston 33 is transmitted to ball joints 35 via a rack shaft 34, and is then transmitted to steerable wheels via non-illustrated steering linkages.

Figure 3:
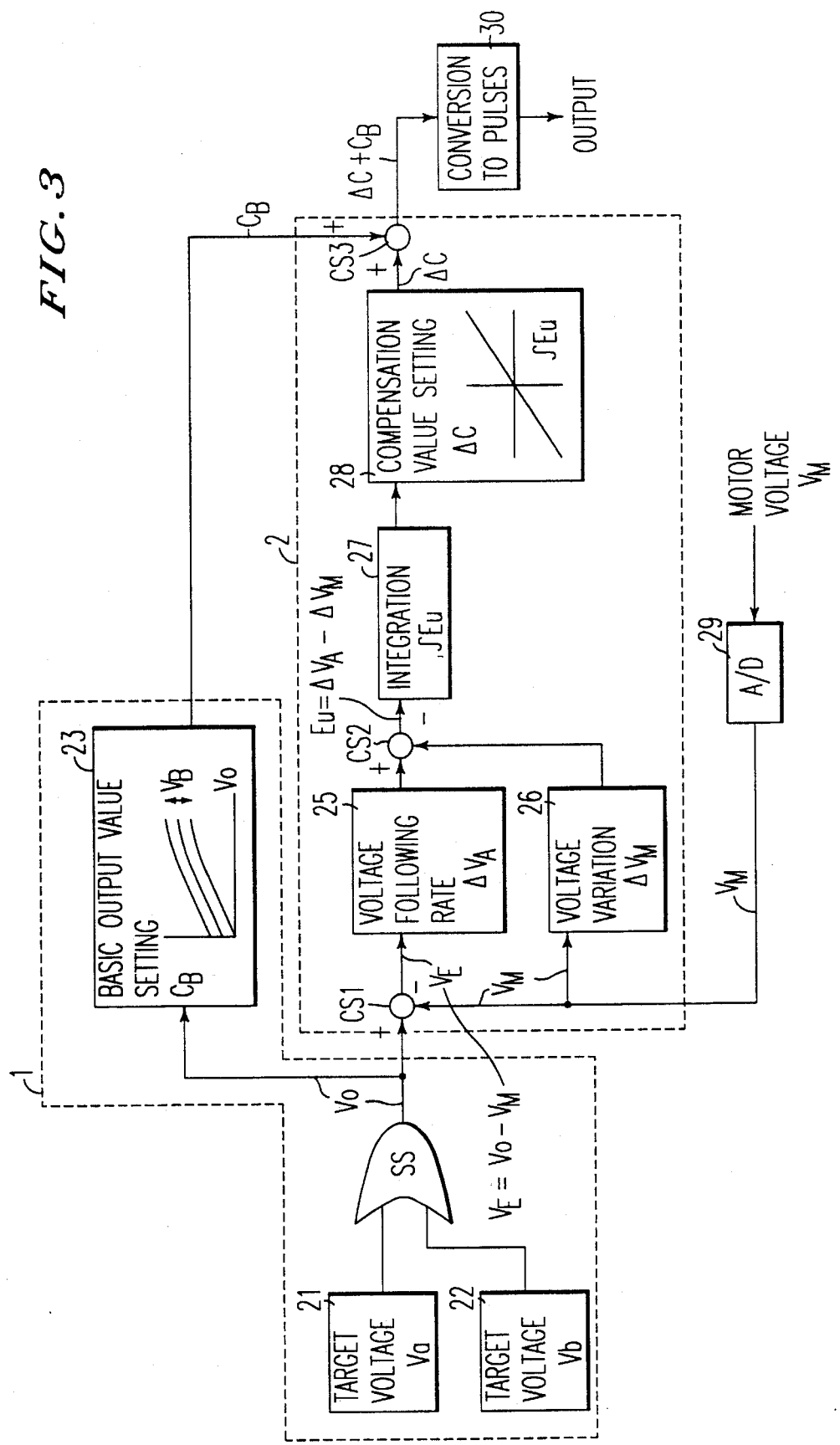
FIG. 3 is a functional block diagram of the controller shown in FIG. 1.

FIG. 3 shows a functional block diagram of the controller 14. The controller 14 is provided with target voltage setting means 1 and voltage compensation means 2. The target voltage setting means 1 is composed of first and second target voltage setting sections 21 and 22, a selecting section SS for selecting larger one of the target values output from the first and second target voltage setting sections 21 and 22 so as to output the selected one as a target voltage Vo, and a basic output value setting section 23 which determines a basic output value $C_B$ based on the target voltage Vo and outputs the determined basic output value $C_B$ to the driver 12. The voltage compensation means 2 is composed of a first calculation section CS1 for obtaining a voltage difference $V_E$ between the target voltage Vo and the motor voltage $V_M$, a voltage following rate calculation section 25 for calculating, as a voltage following rate, a value which is proportional to the voltage difference $V_E$, a voltage variation calculation section 26 for obtaining a voltage variation $\Delta V_M$ of the motor voltage $V_M$, a second calculation section CS2 for calculating a difference between the voltage following rate and the voltage variation $\Delta V_M$ of the motor voltage $V_M$, a compensation value integration section 27 for integrating the difference so as to obtain an integrated value ∫Eu, a compensation value setting section 28 for determining an output compensation value $\Delta C$ based on the integrated value ∫Eu, and a third calculation section CS3 for adding the output compensation value $\Delta C$ to the basic output value $C_B$ output from the basic output value setting section 23 so as to obtain a command voltage value. The output from the voltage compensation means 2 is fed to a functional block 30 in which the command voltage value is converted to pulses. The pulses output from the functional block 30 are fed to the driver 12.

In the present embodiment, the above-described functions are all realized by processing by the CPU in the controller 14, because the entire operation of the power steering apparatus is controlled by the CPU. The structure of the CPU is not shown in the drawings because it is well known. The controller 14 utilizes PI control. For effecting the PI control, the motor voltage is inputted to the controller 14, and is converted to a corresponding digital signal by an AD convertor 29. Since the driver 12 used in this embodiment controls the motor M by a PWM (Pulse Width Modulation) method, the controller 14 outputs pulses for controlling the driver 12.

Figure 2A:
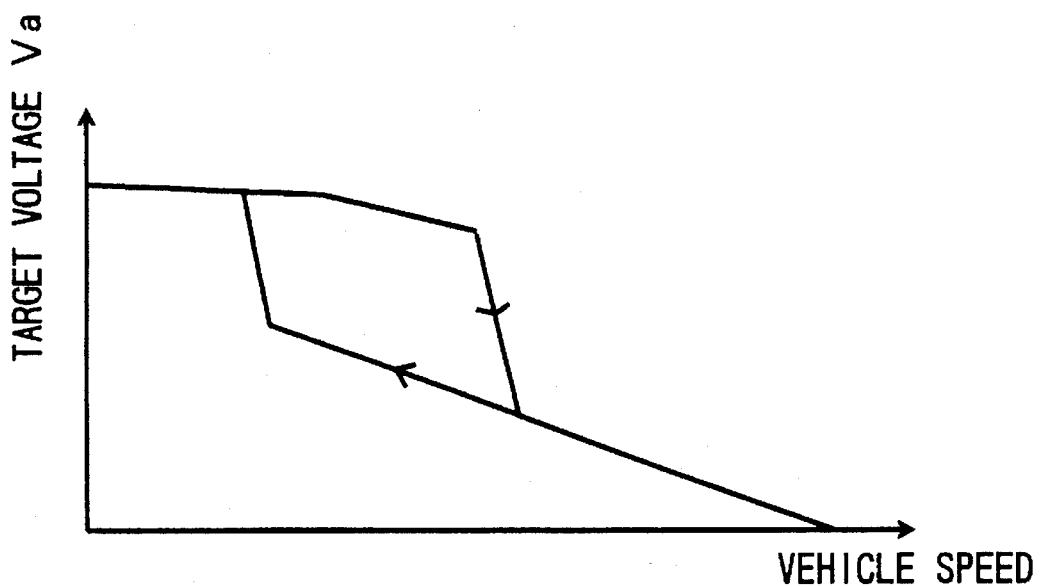
Figure 2B:
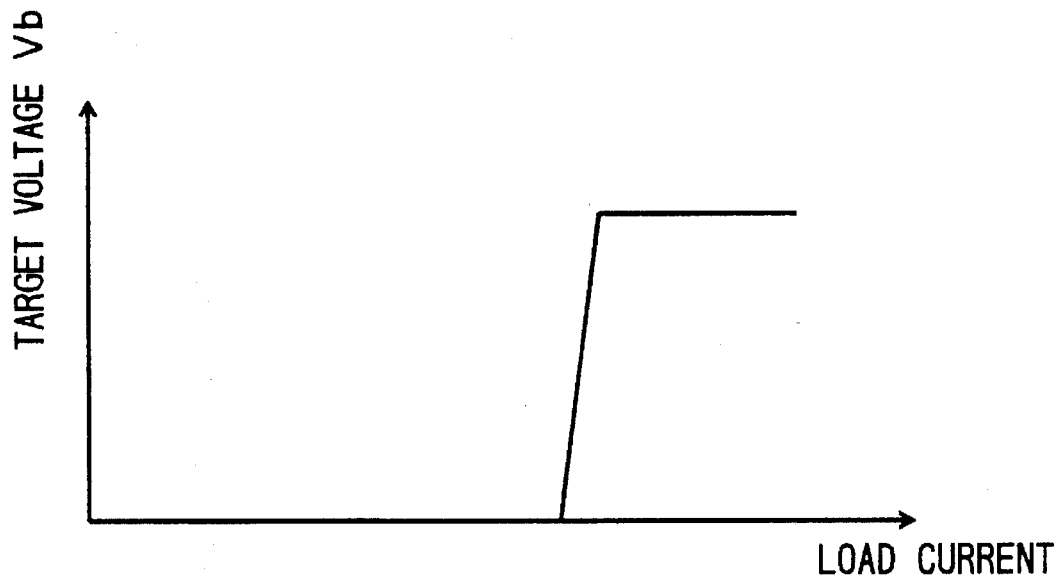

Voltage to be supplied to the motor M of the motor-driven pump is determined based on vehicle speed detected by the speed sensor 11 and load current detected by the current detector 15. In detail, a first target voltage setting section 21 outputs a first target value Va whose magnitude becomes smaller as the vehicle speed increases, as shown in FIG. 2(a). A second target voltage setting section 22 outputs a second target value Vb whose magnitude becomes larger as the detected motor current increases, as shown in FIG. 2(b). Greater one of the target values Va and Vb is used as a target voltage Vo. The target voltage Vo is fed to the basic output value setting section 23 in which a basic output value $C_B$ is calculated based on the target voltage Vo. The calculation is preferably carried out by use of a data map or data table representing a desired control characteristic. In this embodiment, a characteristic curve defining relationship between the target voltage Vo and the basic output value $C_B$ is determined and is memorized as a data map for each of different power supply voltages $V_B$. A basic output value $C_B$ corresponding to the target value Vo and a power supply voltage $V_B$ is calculated by referring the data map, and is output.

Separately, the motor voltage $V_M$ is read from the AD convertor 29, and a voltage difference between the motor voltage $V_M$ and the target voltage Vo is calculated according to the equation $V_E = Vo - V_M$. The voltage difference $V_E$ is fed to the voltage following rate calculation section 25 in which a voltage following rate $\Delta V_A$ is obtained. Next, the differentiated value output from the voltage variation calculation section 26 is subtracted from the voltage following rate $\Delta V_A$ to obtain a difference Eu. The difference is integrated to obtain an integrated value $\int$Eu. The integrated value $\int$Eu is then converted to an output compensation value $\Delta C$ in the output compensation value setting section 28. The output compensation value $\Delta C$ is added to the basic output value $C_B$ so as to obtain a command voltage value C, which is then fed to the driver 12 after being converted to pulses.

With this operation, the motor M is energized to rotate the pump P at a desired rotational speed so that pressurized fluid is output from the pump P at a desired flow rate.

Figure 4:
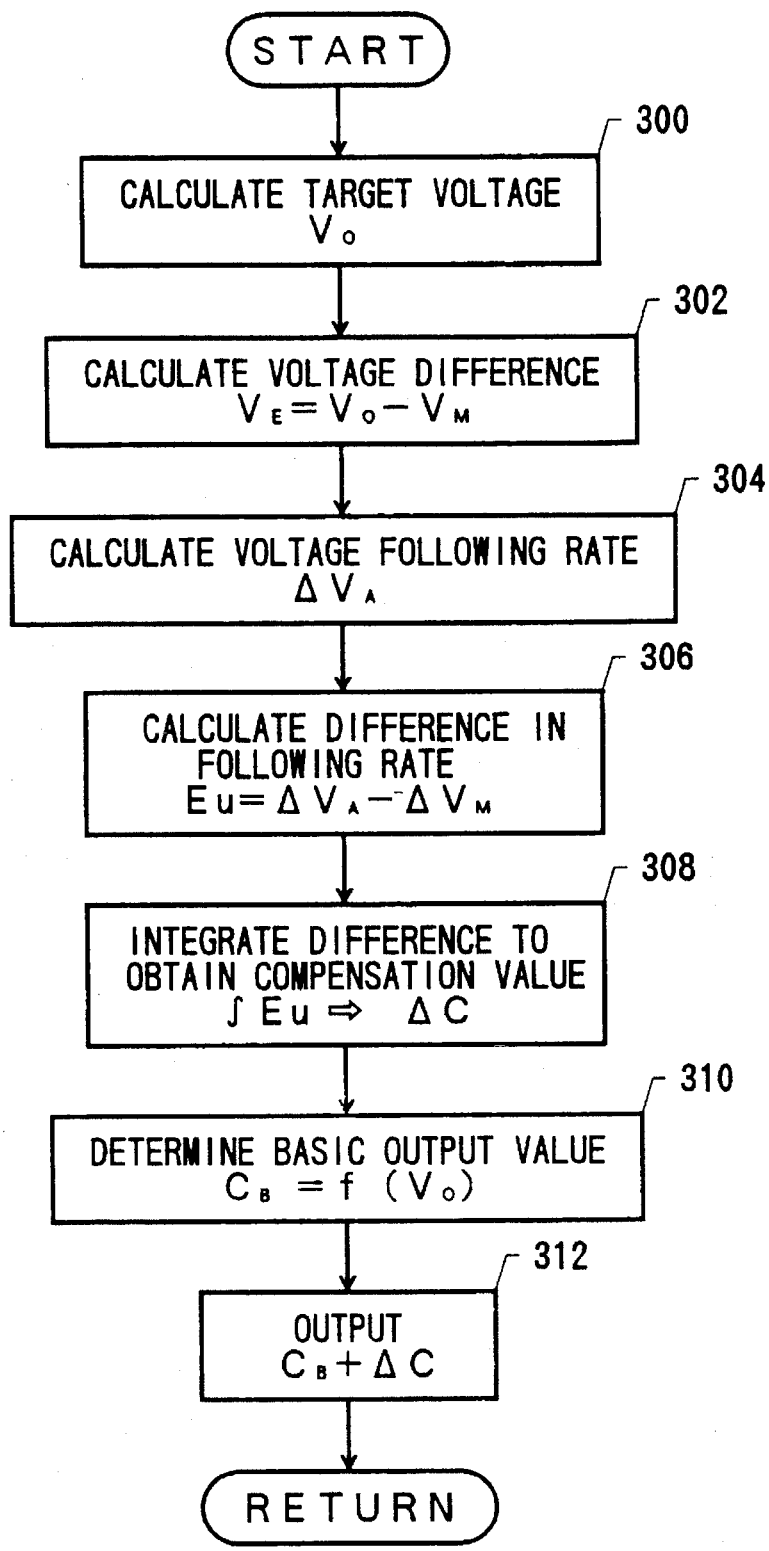
FIG. 4 is a flowchart showing the operation of the controller.

Next, the operation of the controller 14 will be described with reference to the flowchart shown in FIG. 4. In step 300, a target voltage Vo is calculated based on the vehicle speed detected by the speed sensor 11 and the load current detected by the current detector 15. In step 302, a difference $V_E$ between the motor voltage $V_M$ and the target voltage Vo is calculated to obtain a voltage following rate $\Delta V_A$. In subsequent step 304, a voltage following rate $\Delta V_A$ is calculated based on the difference $V_E$. In step 306, a voltage variation $\Delta V_M$ of the motor voltage $V_M$, which represents the actual voltage following rate, is calculated by, for example, differentiation, and the difference Eu between the voltage variation $\Delta V_M$ and the voltage following rate $\Delta V_A$ is calculated by the equation Eu=$\Delta V_A - \Delta V_M$. The difference Eu represents an error in the voltage following rate. In step 308, the difference Eu is integrated to obtain an integrated value $\int$Eu, and an output compensation value $\Delta C$ is determined based on the integrated value $\int$Eu, by using a data map. In step 310, a basic output value $C_B$ is calculated based on the target voltage Vo. In step 312, a command voltage value $C_B + \Delta C$ is obtained and output. The command voltage value is converted to pulse signals, and converted pulse signals are then fed to the driver 12.

The motor used in the present embodiment is a motor designed for use in automobiles, and is driven by a battery. Accordingly, the base output value $C_B$ is set as high as about 10 V. In such a case, the calculated compensation value $\Delta C$ is 2 V at the utmost. Therefore, the maximum variation in the command voltage value is smaller than the maximum amount of fluctuation in a conventional controller which is not provided with the basic output value setting section. In such a conventional controller, the fluctuation reaches 10 V, which is almost equal to the voltage of the battery, when the feedback of the motor voltage is stopped due to malfunction. As described above, since the controller according to the present embodiment is provided with the basic output value setting section, abnormal increase of the difference is prevented, thereby eliminating fears of out of control.

Further, the output value for controlling the driver 12 is varied within a narrow range corresponding to the output compensation value $\Delta C$ with the target voltage $C_B$ acting as the center of the variation. Therefore, the flow rate of pressurized fluid output from the pump can be accurately controlled.

Since the power source is a battery, the voltage of power source decreases during operation, which lowers the rotational speed of the motor M. To compensate this decrease in the voltage $V_B$ of the power source, the basic output value setting section 23 outputs the basic output value $C_B$ which varies depending on the voltage $V_B$ of the battery.

Figure 5:
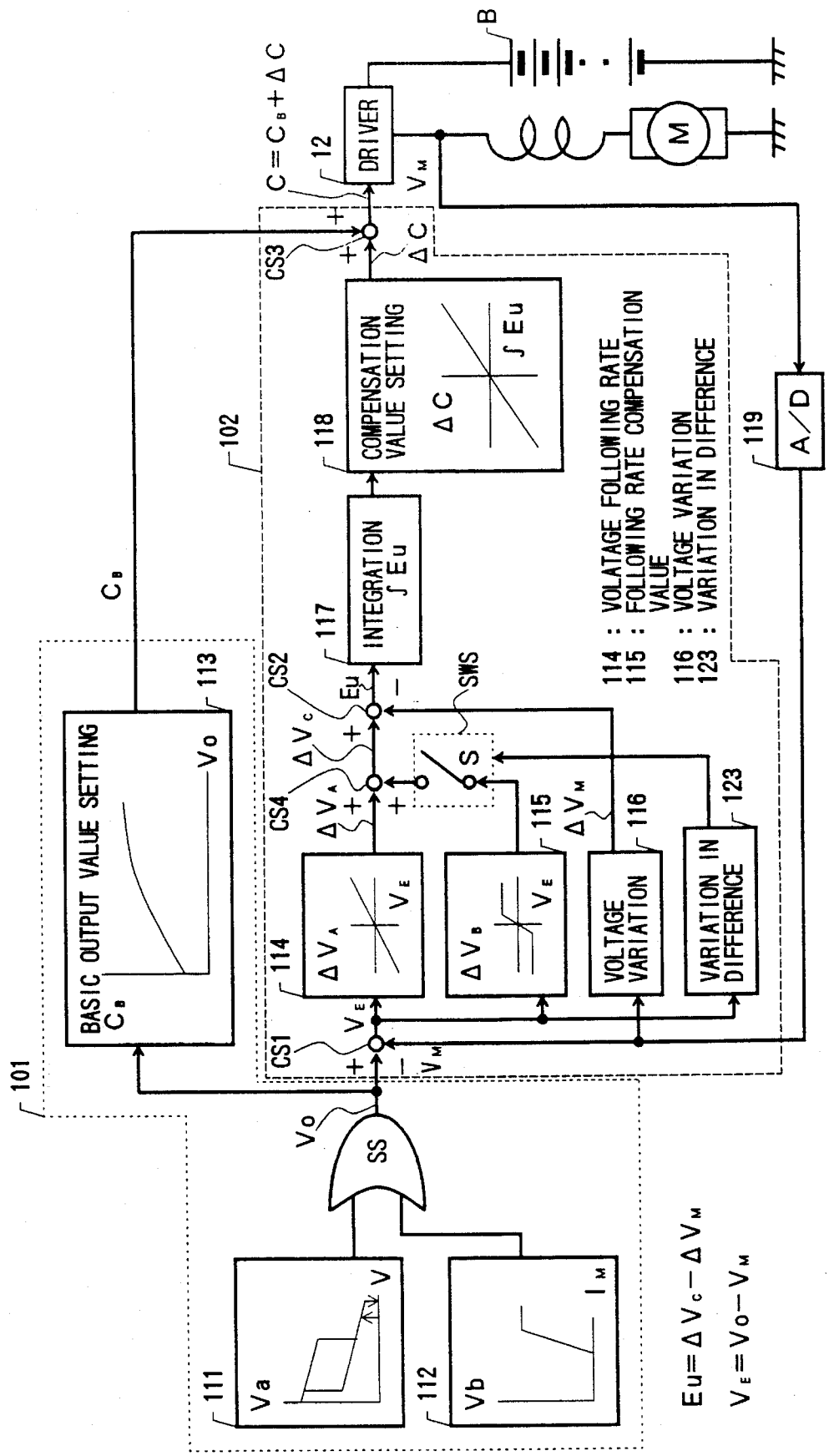
FIG. 5 is a functional block diagram of the controller according to a second embodiment of the present invention.

Second embodiment:

FIG. 5 shows a functional block diagram of the controller 14 according to a second embodiment of the present invention. The controller 14 includes target voltage setting means 101 and voltage compensation means 102. The target voltage setting means 101 is composed of first and second target voltage setting sections 111 and 112, a selecting section SS for selecting larger one of the target value output from the first and second target voltage setting sections 111 and 112 so as to output the selected one as a target voltage Vo, and a basic output value setting section 113 which determines a basic output value $C_B$ based on the target voltage Vo and outputs the determined basic output value $C_B$ to the driver 12. The voltage compensation means 2 is mainly composed of a first calculation section CS1 for obtaining a voltage difference $V_E$ between the target voltage Vo and the motor voltage $V_M$, a voltage following rate calculation section 114 for calculating a voltage following rate based on the voltage difference $V_E$, a following rate compensation value calculation section 115, a voltage variation calculation section 116 for obtaining a voltage variation $\Delta V_M$ of the motor voltage $V_M$, a second calculation section CS2 for calculating a difference between the voltage following rate $\Delta V_C$ and the voltage variation $\Delta V_M$ of the motor voltage, a compensation value integrating section 117 for integrating the difference so as to obtain an integrated value $\int$Eu, an output compensation value setting section 118 for calculating an output compensation value $\Delta C$ based on the integrated value $\int$Eu, and a third calculation section CS3 for adding the output compensation value $\Delta C$ to the basic output value $C_B$ output from the target value setting means 101 so as to obtain a compensated command voltage value C. The voltage compensation means 102 further comprises a fourth calculation section CS4 and a switching section SWS, whose functions will be described later. The output from the voltage compensation means 2 is fed to the driver 12. In the present invention, the command voltage value C is converted to pulses for PWM in the driver 12.

Target voltage to be supplied to the motor M of the motor-driven pump is determined based on vehicle speed detected by the speed sensor 11 and load current detected by the current detector 15. In detail, a first target voltage setting section 111 outputs a first target value Va whose magnitude becomes smaller as the vehicle speed increases. A second target voltage setting section 112 outputs a second target value Vb whose magnitude becomes larger as the detected motor current increases. Greater one of the target values Va and Vb is used as a target voltage Vo. The target voltage Vo is fed to the basic output setting section 113 in which a basic output value $C_B$ is calculated based on the target voltage Vo. Separately, the motor voltage $V_M$ is read from the AD convertor 119, and a voltage difference $V_E$ between the motor voltage $V_M$ and target voltage vo is calculated according to the equation $V_E=Vo-V_M$. The voltage difference $V_E$ is fed to the voltage following rate calculation section 114 in which a voltage following rate $\Delta V_A$ is obtained. Separately, a compensation value $\Delta V_B$ for the voltage following rate is calculated, and added to $\Delta V_A$ to obtain $\Delta V_C$. In the present embodiment, variations in the voltage difference $V_E$ is calculated in the variation detection section 123. When the voltage difference $V_E$ increases, the switch section SWS is turned on so that the following rate compensation value $\Delta V_B$ is added to the voltage following rate $\Delta V_A$. When the voltage difference $V_E$ decreases, the switch section SWS is turned off so that the following rate compensation value $\Delta V_B$ is not added to the voltage following rate $\Delta V_A$. Next, the voltage variation output from the voltage variation calculation section 116 is subtracted from the voltage following rate $\Delta V_A$ to obtain a difference Eu in the following rate. The difference Eu is integrated to obtain an integrated value ∫Eu. The integrated value ∫Eu is then converted to an output compensation value $\Delta C$ in the output compensation value setting section 118. The output compensation value $\Delta C$ is added to the basic output value $C_B$ so as to obtain a compensated command voltage value C, which is then fed to the driver 12.

The second target value Vb output from the second target voltage setting section 112 is set such that the energy is continuously supplied to the motor M, without carrying out PWM control, in a certain current range in which heart generation at the driver 12 would become large if the PWM control is carried out.

Figure 6:
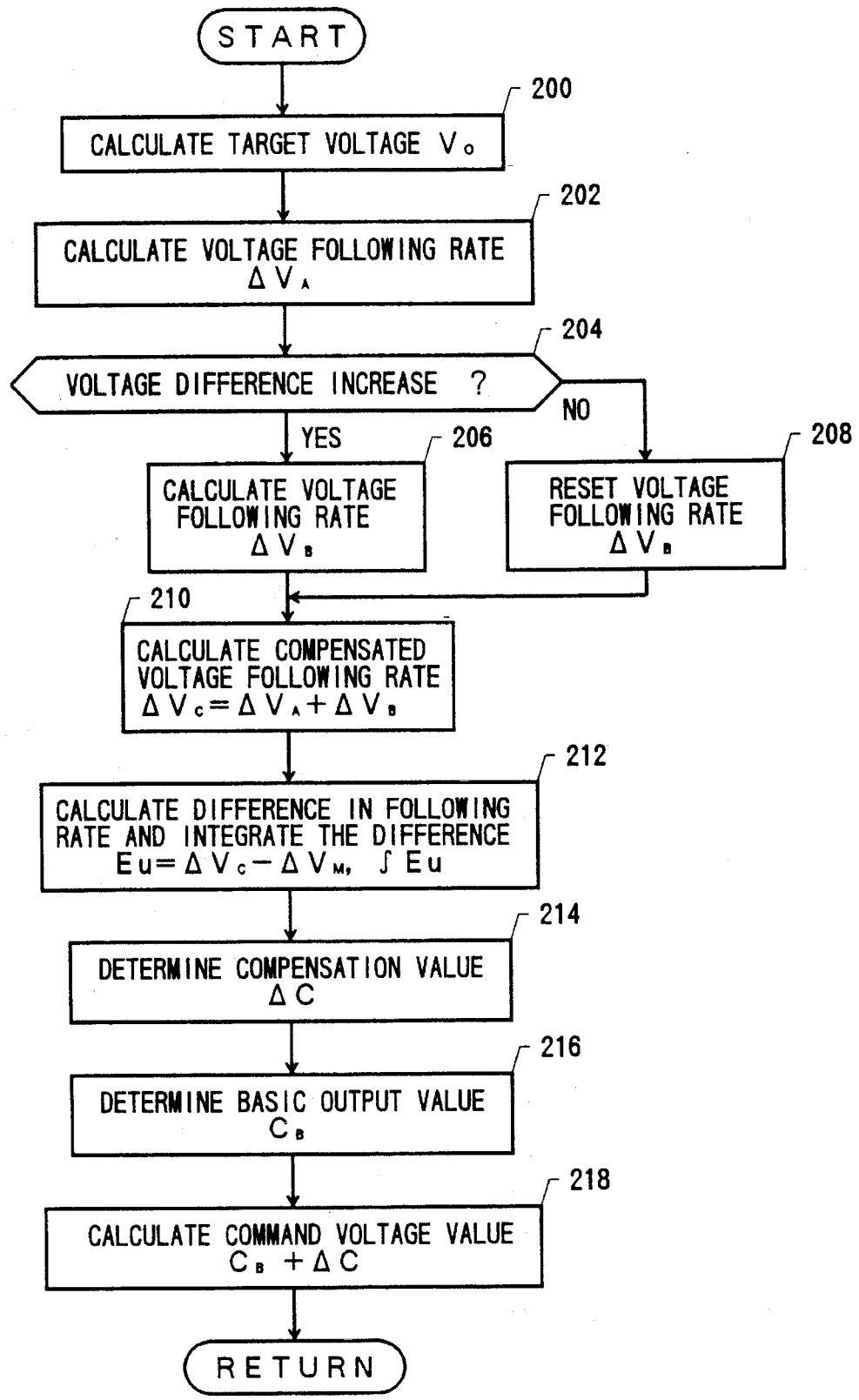
FIG. 6 is a flowchart showing the operation of the controller in the second embodiment.

Next, the operation of the controller 14 will be described with reference to the flowchart shown in FIG. 6. In step 200, a target voltage Vo is calculated based on the vehicle speed detected by the speed sensor 11 and the load current detected by the current detector 15. In step 202, a voltage difference $V_E$ between the motor voltage $V_M$ supplied to the motor M and the target voltage Vo is calculated to obtain a voltage following rate $\Delta V_A$. In subsequent step 204, a variation of the voltage difference $V_E$ is detected, and it is judged whether or not the voltage difference $V_E$ increases. When it is judged that the voltage difference $V_E$ increases, a compensation value $\Delta V_B$ is calculated and is stored in step 206. When it is judged that the voltage difference $V_E$ does not increase, a compensation value $\Delta V_B$ is reset to zero in step 208. The processing in steps 206 and 208 correspond to the switch section SWS. In step 210, $\Delta V_B$ is added to $\Delta V_A$ to obtain $\Delta V_C$. In step 212, a voltage variation $\Delta V_M$ of the motor voltage $V_M$ is calculated, and the difference Eu between the voltage variation $\Delta V_M$ and the calculated value $\Delta V_C$ is obtained according to the equation $Eu=\Delta V_C-\Delta V_M$. The difference Eu is integrated to obtain an integrated value ∫Eu. In step 214, an output compensation value $\Delta C$ is obtained based on the integrated value ∫Eu. In step 216, a basic output value $C_B$ is calculated based on the target voltage Vo. In step 218, a command voltage value $C_B+\Delta C$ is calculated and is output to the driver 12.

By repeating above-described processing at predetermined intervals, the voltage supplied to the motor M is controlled with high followability so that the rotational speed of the pump can be controlled to accurately follow a target value.

Figure 7:
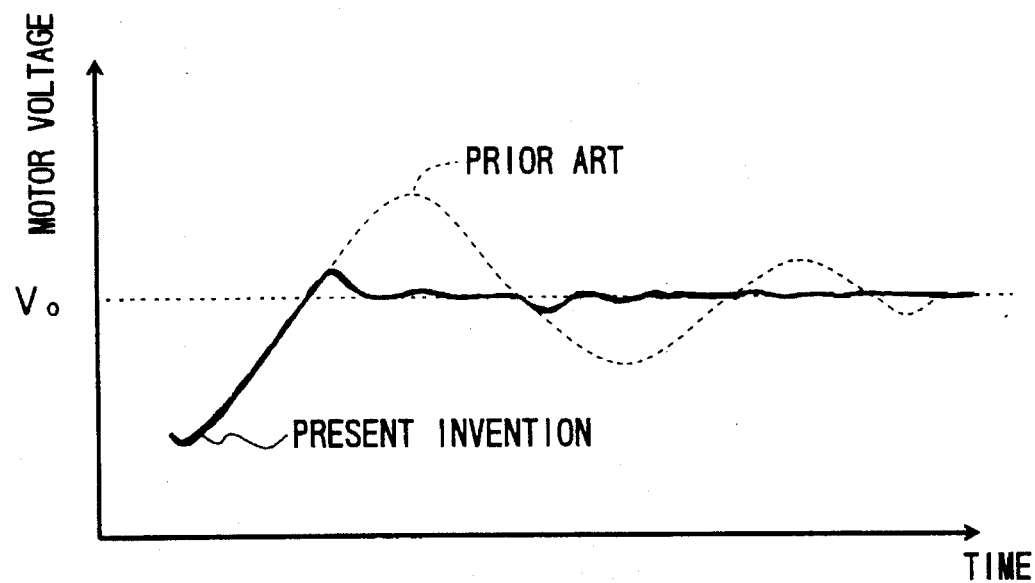
FIG. 7 is a graph showing the overshoot characteristic of the controller in the second embodiment, and the overshoot characteristic of a conventional controller.

FIG. 7 shows variations in the motor voltage actually supplied to the motor M. In a conventional controller, the motor voltage approaches the target voltage Vo while cyclically fluctuating with overshoots. In the controller according to the present embodiment, the motor voltage quickly reaches the target voltage Vo without causing overshoots.

Figure 8:
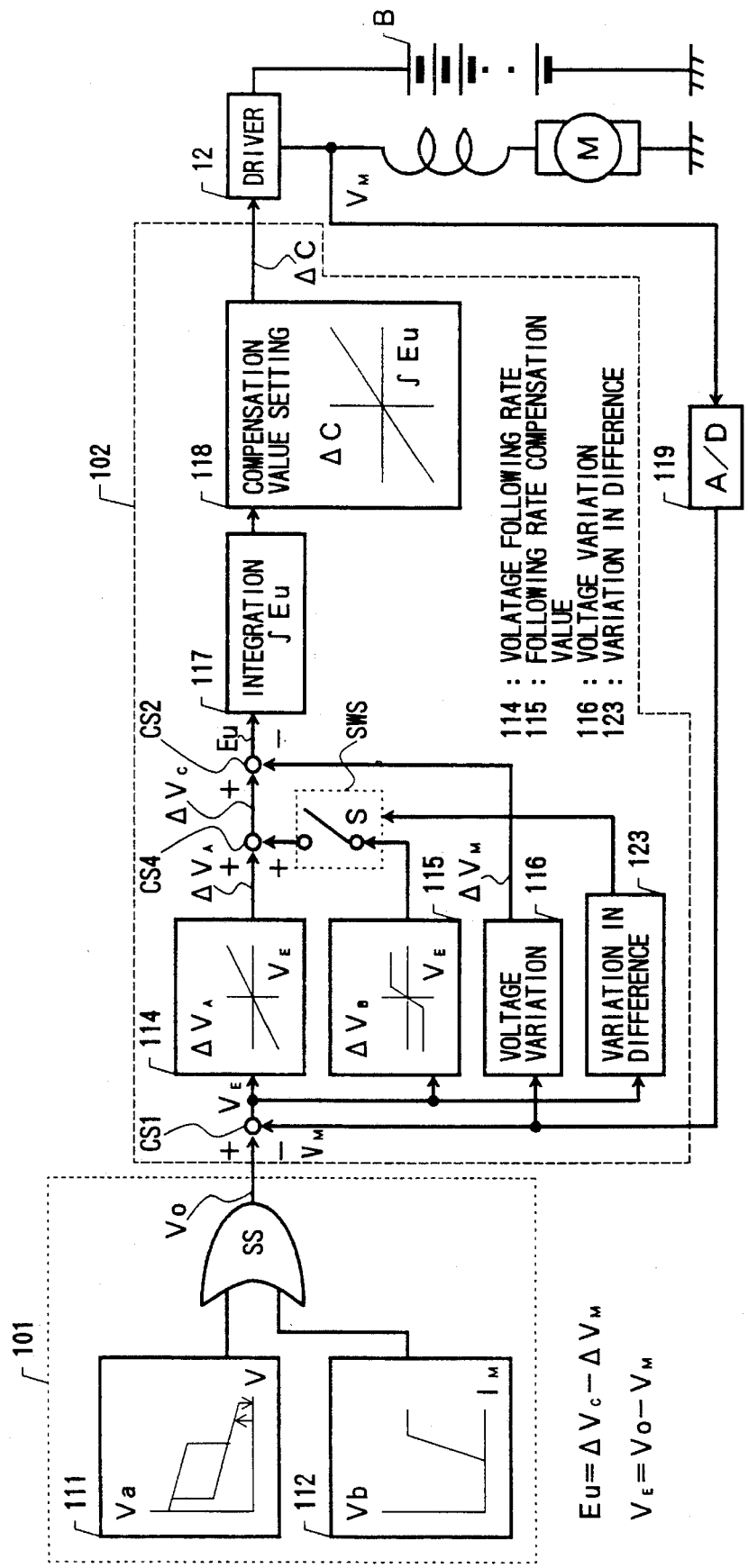
FIG. 8 is a functional block diagram of the controller according to a third embodiment of the present invention.

Third embodiment:

In the controller 14 according to a third embodiment of the present invention, the basic output value setting section 113 used in the second embodiment is removed, as shown in FIG. 8. Namely, the present invention is combined with a conventional PI control. Namely, the following rate compensation value calculation section 115, the variation detection section 123, the switching section SWS and the fourth calculation section CS4 are added. The controller 14 according to the third embodiment provides the same effect as obtained in the second embodiment. Namely, overshoots are reduced so that the motor voltage quickly reaches the target voltage.

Figure 9:
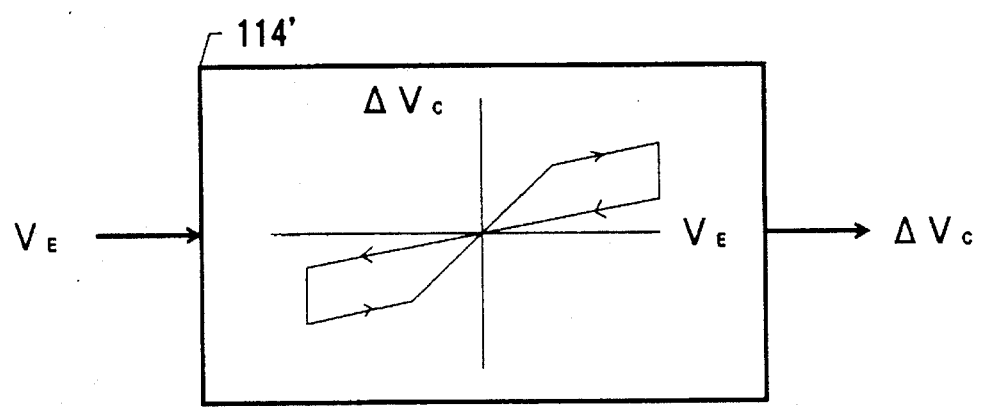
FIG. 9 is a unified block diagram including the functions of the voltage following rate calculation section and the following rate compensation value calculation section.

According to the control theory, the following rate compensation value calculation section 115 can be combined with the voltage following rate calculation section 114 to form a sing functional block 114' as shown in FIG. 9. This means that the characteristic of the voltage following rate calculation section 114 is changed to have a hysteresis characteristic. This characteristic improves the followability. In the present invention, various characteristics can be given to the voltage following rate calculation section 114 to control the flow rate of the pressurized fluid output from the pump in a desired manner.

In the above-described embodiments, the present invention is applied to a power steering apparatus of a motor-driven type. However, the present invention can also be applied to a so-called electric power steering apparatus in which assist torque is directly produced by an electric motor.

Obviously, numerous modifications and variations of the present invention are possible in light of the above teachings. It is therefore to be understood that within the scope of the appended claims, the present invention may be practiced otherwise than as specifically described herein.

What is claimed is:

1. A controller for a power steering apparatus wherein pressurized fluid output from a hydraulic pump driven by an electric motor is supplied to a steering gear mechanism to produce assist power and wherein voltage supplied to said electric motor is controlled so as to change the flow rate of pressurized fluid supplied to said steering gear mechanism, said controller comprising:

means for setting a target value representing a target voltage to be supplied to said electric motor;

means for detecting a detection value representative of a voltage being supplied to said electric motor;

means for generating a voltage compensation value based on said target value and said detection value;

means for generating a basic value based on said target value;

means for adding said voltage compensation value to said basic value to obtain a compensated target value; and means for supplying said electric motor with a voltage corresponding to said compensated target value.

2. A controller for a power steering apparatus according to claim 1, wherein said means for generating a voltage compensation value comprises:

means for calculating a voltage difference between the target voltage and the detected voltage;

and means for integrating the calculated voltage difference to obtain said voltage compensation value.

3. A controller for a power steering apparatus according to claim 1, wherein said means for generating a voltage compensation value comprises:

means for calculating a voltage difference between the target voltage and the detected voltage;

means for calculating a differentiated value of the detected voltage;

means for calculating a difference between said voltage difference and said differentiated value to obtain a compensation value; and means for integrating said compensation value to obtain said voltage compensation value.

4. A controller for a power steering apparatus according to claim 1, wherein said means for generating basic value includes means for changing said basic value depending on a voltage of a power source from which electricity is supplied to said electric motor.

5. A controller for a power steering apparatus according to claim 1, wherein said means for setting a target value comprises:

means for generating a first target value based on vehicle speed;

means for generating a second target value based on load current flowing through said motor; and means for selecting a larger one of said first and second target values; and wherein said means for generating a basic value includes means for changing said basic value depending on a voltage of a power source from which electricity is supplied to said electric motor.

6. A controller for a power steering apparatus wherein voltage supplied to a motor is controlled so as to change assist torque produced by the power steering apparatus, said controller comprises:

means for generating a target value representing a target voltage to be supplied to said motor;

means for detecting a voltage supplied to said motor;

means for calculating a voltage difference between said detected voltage and said target voltage;

means for obtaining a voltage following rate by multiplying said voltage difference by a predetermined coefficient;

means for detecting variations in said voltage difference;

means for increasing said voltage following rate to obtain a compensated voltage following rate when a detected variation in said voltage difference increases;

means for adding a compensation value corresponding to said compensated voltage following rate to said target value to obtain a compensated target value; and means for supplying said motor with a voltage corresponding to said compensated target value.

7. A controller for a power steering apparatus according to claim 6, wherein said means for generating a target value comprises:

means for generating a first target value based on vehicle speed;

means for generating a second target value based on load current flowing through said motor; and means for selecting larger one of said first and second target values; and means for outputting a target value corresponding to said selected target value.

8. A controller for a power steering apparatus according to claim 6, wherein said means for increasing said voltage following rate comprises:

means for obtain a following rate compensation value based on said voltage difference;

means for detecting an increase in said voltage difference; and means for adding said following rate compensation value to said voltage following rate when an increase in said voltage difference is detected.

9. A controller for a power steering apparatus wherein voltage supplied to a motor is controlled so as to change assist torque produced by the power steering apparatus, said controller comprises:

means for generating a target value representing a target voltage to be supplied to said motor;

means for detecting a voltage supplied to said motor;

means for calculating a voltage difference between said detected voltage and said target voltage;

means for obtaining a voltage following rate by multiplying said voltage difference by a predetermined coefficient;

means for detecting variations in said voltage difference;

means for increasing said voltage following rate to obtain a compensated voltage following rate when a detected variation in said voltage difference increases; and means for supplying said motor with a voltage corresponding to said compensated voltage following rate.

10. A controller for a power steering apparatus according to claim 9, wherein said means for generating a target value comprises:

means for generating a first target value based on vehicle speed;

means for generating a second target value based on load current flowing through said motor; and means for selecting larger one of said first and second target values as said target value.

11. A controller for a power steering apparatus according to claim 9, wherein said means for increasing said voltage following rate comprises:

means for obtain a following rate compensation value based on said voltage difference;

means for detecting an increase in said voltage difference; and means for adding said following rate compensation value to said voltage following rate when an increase in said voltage difference is detected.

* * * * *